Dec. 15, 1931.  G. I. RAY  1,836,682
SHOCK ABSORBER FOR FLUID PRESSURE LINES
Filed July 9, 1930
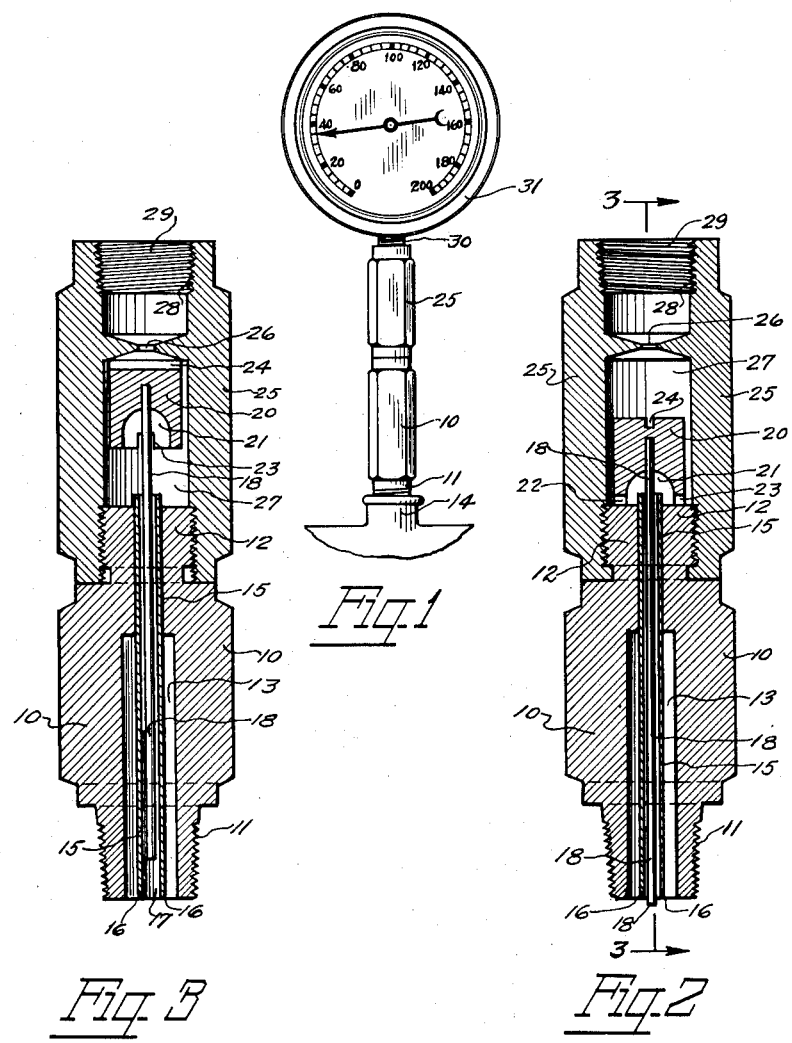
GEORGE I. RAY,
INVENTOR.
BY 
ATTORNEY.

Patented Dec. 15, 1931

1,836,682

UNITED STATES PATENT OFFICE

GEORGE I. RAY, OF CHARLOTTE, NORTH CAROLINA

SHOCK ABSORBER FOR FLUID PRESSURE LINES

Application filed July 9, 1930. Serial No. 466,781.

My invention relates to a shock absorber for fluid pressure lines, and although I have shown it in use in combination with a pressure gauge, it is evident that it is capable of use in any fluid pressure line to prevent any part of the line beyond the point where my device is installed from receiving shocks due to a sudden increase of pressure.

An object of my invention is to provide a shock absorber for a fluid pressure line with means for permitting an even flow of the fluid through the device and to restrict a sudden and rapid increase in the pressure beyond the point where my device is installed.

Some of the objects of my invention having been stated other objects will appear as the description proceeds, when taken in connection with the accompanying drawings, in which—

Figure 1 is an elevation of my device shown in connection with a pressure gauge;

Figure 2 is a vertical cross-sectional view;

Figure 3 is a vertical cross-sectional view taken along the line 3—3 in Figure 2.

Referring more specifically to the drawings the numeral 10 represents the member which is threaded at its lower end as at 11 and which is threaded also at its upper end as at 12, and this member 10 has an elongated circular cavity 13 therein, the portion 11 being adapted to be secured to one portion of a pressure line as at 14. The member 10 has the tube 15 firmly secured therein, the lower end of said tube 15 being chamfered or beveled as at 16 so as to direct a large portion of foreign matter into the cavity 13 instead of causing it to pass through the hollow portion 17 of tube 15. This tube projects slightly above the top of member 12 and in the hollow portion 17 of the tube 15 is mounted the wire 18 which is of less diameter than the hollow portion 17, so as to allow free movement of the member 18 with relation to the member 15 and to allow a fluid to pass through the member 15 while the wire 18 is in position therein.

The portion 18 has a weight member secured on the upper end thereof which weight member 20 has the cavity 21 therein which surrounds the upper end of tube 15 when in lowered position as shown in Figure 2, and this member 20 has the notches 22 and 23 in the edge portions thereof through which a fluid may continuously pass after passing through the tube 15. This member 20 also has a transversely disposed groove 24 in the upper end thereof and this member 20 is surrounded by the casing 25 which is threadably secured on the portion 12, and this member 25 has the restricted passageway 26 therein which connects the cavity 27 with the cavity 28, said cavity 28 having interior threads 29 therein to which may be connected the other end of the fluid pressure line.

In operation steam or any other fluid passes through the tube 15 and raises the stem and weight to the position shown in Figure 3. The member 20 allows the fluid to escape through the cavities 22 and 23, and this fluid also forces the member 20 upward and seats it in the upper end of cavity 27 and the transverse slot 24 allows the steam or other fluid to pass by this member 20 and through the restricted opening 26 and on into the other portion of the pressure line, and in the case shown in Figure 1 it allows it to pass into the steam pressure gauge, but it is evident that this device may be used in any fluid pressure line as a shock absorber and to limit the amount of fluid which may be passed through the device in a given time.

In Figure 1 I have shown my device having the nipple 30 secured in the threaded portion 29 with the steam pressure gauge 31 of conventional design secured thereto, and while I have shown in Figure 1 the combination of my shock absorber and a steam pressure gauge, it is evident that this shock absorber can be used in any fluid pressure line to control the amount of fluid which may be passed therethrough.

In the drawings and specification I have set forth a preferred embodiment of my invention, and although specific terms are employed, they are used in a generic and descriptive sense only, and not for purposes of limitation, the scope of my invention being set forth in the appended claims:

I claim:

1. In a shock absorber for fluid pressure lines having a constriction throttling the flow of fluid under pressure, a movable clearing stem within said constriction, a head on the upper end of the stem, a seat for said head when the head is in raised position, a leak in the said head, and means for permitting relative movement between said stem and said constriction.

2. In a shock absorber for fluid pressure lines having two separated constrictions and also having an enlarged cavity between said constrictions, a movable clearing stem loosely mounted in one constriction, a head member on said stem, said head being located in said cavity and being adapted to throttle the flow of fluid prior to passing through the other constriction when said stem is moved in one direction in said first constriction.

3. A shock absorber for fluid pressure lines having a plurality of constrictions, a clearing stem loosely mounted in one constriction, means for permitting relative movement between said stem and the constriction in which said stem is mounted, and means on said stem for throttling the flow of fluid prior to passing through the other constriction when the stem is in raised position.

4. A shock absorber for a fluid pressure line having a constriction therein, a tube fixedly secured in said constriction, said tube cooperating with the walls of the absorber to provide a cavity surrounding said tube, a clearing stem movably mounted in said tube and means associated with said stem for permitting relative movement between said stem and said tube.

5. A shock absorber for fluid pressure lines having two constrictions therein with a movable clearing stem mounted in one constriction, said clearing stem having means thereon for retarding the flow of fluid prior to passing through the other constriction when the clearing stem is in raised position.

6. A shock absorber for a fluid pressure line having two constrictions therein, a clearing stem mounted in one constriction and being adapted to have movement relative to said constriction, a head member on said clearing stem adapted to restrict the flow of fluid prior to passing through the other constriction when the clearing stem is moved to raised position.

7. A shock absorber for a fluid pressure line having two constrictions therein, a clearing stem mounted in one constriction and being adapted to have movement relative to said one constriction, a head member on said clearing stem adapted to restrict the flow of fluid prior to passing through the other constriction when the clearing stem is moved to raised position, said first constriction having a cavity therearound for the reception of non-fluid matter.

In testimony whereof I affix my signature.

GEORGE I. RAY.